United States Patent
Kim et al.

(10) Patent No.: US 11,063,285 B2
(45) Date of Patent: Jul. 13, 2021

(54) APPARATUS FOR MANUFACTURING ELECTROLYTE MEMBRANE AND METHODS FOR MANUFACTURING ELECTROLYTE MEMBRANE USING THE SAME

(71) Applicants: Hyundai Motor Company, Seoul (KR); Kia Motors Corporation, Seoul (KR)

(72) Inventors: Yong Min Kim, Seoul (KR); Ju Young Lee, Gyeonggi-do (KR); Ha Yeong Yu, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 235 days.

(21) Appl. No.: 16/194,535

(22) Filed: Nov. 19, 2018

(65) Prior Publication Data

US 2019/0356007 A1    Nov. 21, 2019

(30) Foreign Application Priority Data

May 15, 2018    (KR) .......................... 10-2018-0055227

(51) Int. Cl.
*H01M 8/1081*    (2016.01)
*H01M 8/1086*    (2016.01)
*H01M 8/1018*    (2016.01)

(52) U.S. Cl.
CPC ....... *H01M 8/1081* (2013.01); *H01M 8/1086* (2013.01); *H01M 2008/1095* (2013.01)

(58) Field of Classification Search
CPC ............ H01M 8/1081; H01M 8/1086; H01M 2008/1095
See application file for complete search history.

(56) References Cited

U.S. PATENT DOCUMENTS

| | | | |
|---|---|---|---|
| 9,543,590 B2 | 1/2017 | Kim et al. | |
| 2004/0175506 A1* | 9/2004 | Ebbrell | ...................... B32B 5/18 427/385.5 |
| 2016/0172701 A1* | 6/2016 | Desie | .................... H01M 8/109 428/220 |

FOREIGN PATENT DOCUMENTS

| | | |
|---|---|---|
| JP | 2009-218006 A | 9/2009 |
| JP | 2017-224507 A | 12/2017 |
| JP | 2017-224607 A | 12/2017 |
| KR | 101080783 B1 | 11/2011 |
| KR | 101742390 B1 | 5/2017 |
| KR | 101764068 B1 | 8/2017 |

* cited by examiner

*Primary Examiner* — Stewart A Fraser
(74) *Attorney, Agent, or Firm* — Mintz Levin Cohn Ferris Glovsky and Popeo, P.C.; Peter F. Corless

(57) ABSTRACT

Disclosed are an apparatus for manufacturing an electrolyte membrane and a method for manufacturing an electrolyte membrane using the same, which may prevent discoloration of the electrolyte membrane through a controlled drying process of the electrolyte membrane. The electrolyte membrane manufactured by the method of the present invention may not be discolored and performance and durability of fuel cells using the electrolyte membrane may be improved due to uniform drying of the electrolyte membrane during the manufacturing. For example, competitively simultaneous evaporation of solvents in an ionomer composition in the drying process may be prevented.

15 Claims, 5 Drawing Sheets

APPARATUS FOR MANUFACTURING ELECTROLYTE MEMBRANE AND METHODS FOR MANUFACTURING ELECTROLYTE MEMBRANE USING THE SAME

CROSS-REFERENCE TO RELATED APPLICATION

This application claims, under 35 U.S.C. § 119(a), the benefit of priority to Korean Patent Application No. 10-2018-0055227 filed on May 15, 2018, the entire contents of which are incorporated herein by reference.

TECHNICAL FIELD

The present invention relates to an apparatus for manufacturing an electrolyte membrane and a method for manufacturing an electrolyte membrane using the same. The apparatus and the method for manufacturing an electrolyte membrane may prevent discoloration of the electrolyte membrane through a controlled drying process of the electrolyte membrane.

BACKGROUND

In the related arts, conventional methods for manufacturing electrolyte membranes, solvents may not be sufficiently removed during drying causing deterioration in performance of electrolyte membranes and thus deteriorating fuel cell performance.

For example, conventional methods for manufacturing electrolyte membranes include mixing an ionomer with water and an organic solvent such as an alcohol, coating release paper with the resulting mixture and drying the release paper. In this case, drying occurs while water and the solvent evaporate competitively. For this reason, the solvent residue remains on the electrolyte membrane, causing discoloration. Such discoloration may be considered to be evidence of presence of residual solvent in the electrolyte membrane, which may cause a resistance of ionic conduction which affects the fuel cell performance.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, the present invention to provide a method that may inhibit on competitive evaporation of the solvent in the process of drying, thereby removing the residual solvent as much as possible and at the same time, improving fuel cell performance.

In one aspect, provided is a method of manufacturing an electrolyte membrane. The method may include dispersing an ionomer in a solvent admixture to prepare an ionomer composition, coating a substrate with the ionomer composition to form a coating layer, and drying the coating layer-formed substrate in the presence of a gas. The gas may include a first solvent and the solvent admixture may include the first solvent and one or more solvents different from the first solvent.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer and a polystyrene-based polymer.

The solvent admixture may suitably include water and further include one or more selected from the group consisting of ethanol, isopropyl alcohol, n-propylalcohol, butylalcohol, methanol, dimethylformamide, dimethylacetamide, dimethyl sulfoxide, N-methylpyrrolidone, tetrahydrofuran, acetone, methylethylketone, tetramethylurea, trimethyl phosphate, butyrolactone, isophorone, carbitol acetate, methyl isobutyl ketone, N-butylacetate, cyclohexanone, diacetone alcohol, diisobutyl ketone, ethyl acetoacetate, glycol ether, propylene carbonate, ethylene carbonate, dimethyl carbonate and diethyl carbonate.

The substrate may suitably include one or more selected from the group consisting of polyethylene, polypropylene, polyethylene terephthalate, polybutylene terephthalate, polyvinylidene fluoride, polyvinyl difluoroethylene, polyvinyl chloride, polyvinylidene chloride, polyester, polyacetal, polyamide, polycarbonate, polyimide, polyetherketone, polyetheretherketone, polyethylene ether nitrile, polyethylene naphthalene, polyethersulfone, polyphenylene oxide, polyphenylene sulfide, polytetrafluoroethylene, a tetrafluoroethylene-hexafluoropropylene copolymer, and a tetrafluoroethylene-perfluoroalkyl vinyl ether copolymer.

The method may further include disposing a porous support into the formed coating layer, and coating the disposed porous support with the ionomer composition. Preferably, the porous support may suitably include expanded polytetrafluoroethylene (ePTFE).

The term "expanded polytetrafluoroethylene" or "e-PTFE" is meant by a polytetrafluoroethylene polymer product that may contain microporous fibrous structures. Typical e-PTFE may be stretchable or flexible and may allow passage of fluids (e.g., gas or liquid) through the porous structure.

During the drying, the one or more solvents different from the first solvent may be evaporated earlier than the first solvent.

During the drying, the gas may be present in a saturated state.

The one or more solvents different from the first solvent may suitably include an alcohol-based solvent.

Preferably, the first solvent may be water.

The drying may be performed for about 5 minutes to 30 minutes.

The drying may be performed in a dryer and relative humidity (RH) in the dryer may be about 30% or greater.

Preferably, a temperature of the dryer may be maintained at less than a boiling point of a solvent having the lowest boiling point in the solvent admixture.

The method may further include, after the drying, heat-treating the coating layer-formed substrate at a temperature of about 140 to 200° C.

The heat treatment time may suitably be about 5 minutes to 30 minutes.

In another aspect, provided is an apparatus for manufacturing an electrolyte membrane. The apparatus may include an unwinding roll configured to supply a substrate, a coater configured to coat the substrate supplied from the unwinding roll with an ionomer composition, a dryer configured to dry the substrate coated with the ionomer composition by the coater, a heater configured to heat-treat the substrate having passed through the dryer to manufacture an electrolyte membrane, and a rewinding roll configured to wind the electrolyte membrane having passed through the heater.

The coater may perform coating by one or more coating methods selected from knife coating, gravure coating, micro-gravure coating, slot die coating, roll coating, spin coating, spray coating, dip coating, flow coating, doctor blade, dispensing, inkjet printing, offset printing, screen printing, pad printing, gravure printing, flexography printing, and stencil printing.

In another aspect, provided is an electrolyte membrane manufactured by the method as described herein.

In further aspect, provided is a fuel cell including the electrolyte membrane as described herein.

Still further provided is a vehicle including the fuel cell as described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
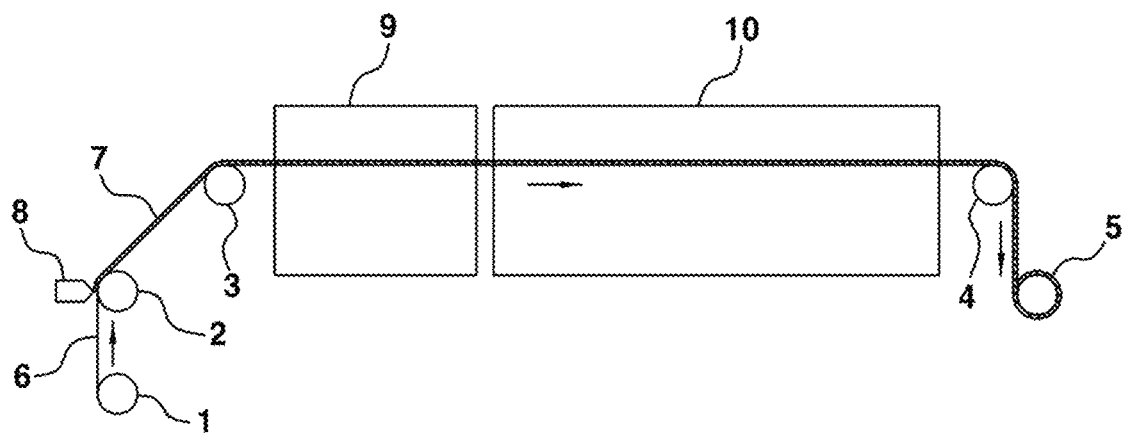
FIG. 1 is a flowchart schematically illustrating an exemplary electrolyte membrane and an exemplary method for manufacturing the same according to an exemplary embodiment of the present invention.

The objects described above, and other objects, features and advantages will be clearly understood from the following preferred embodiments with reference to the annexed drawings. However, the present invention is not limited to the embodiments and will be embodied in different forms. The embodiments are suggested only to offer thorough and complete understanding of the disclosed context and sufficiently inform those skilled in the art of the technical concept of the present invention.

It will be further understood that the terms "comprises" and/or "has", when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that when an element such as a layer, film, region or substrate is referred to as being "under" another element, it can be directly under the other element or an intervening element may also be present.

The terminology used herein is for the purpose of describing particular embodiments only and is not intended to be limiting. As used herein, the singular forms "a," "an" and "the" are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A saturated state of gas generally means chemical equilibrium wherein gas is unacceptable any more within a limited area. The term "saturated state" as used in the present invention covers a broad range from a state in which a desired solvent does not evaporate any more to a state in which it is evaporated less than the solvent to be removed by evaporation and cannot be removed by evaporation. That is, when referring to the saturated state herein, the corresponding vapor pressure may not be a saturated vapor pressure. For this reason, confusion should be avoided.

The present invention relates to a method for manufacturing an electrolyte membrane. The method includes the steps of coating a substrate with an ionomer composition including an ionomer, followed by drying. Preferably, the method may include controlling drying environments to completely remove the solvent from the substrate.

The method for manufacturing an electrolyte membrane may include dispersing an ionomer in two or more solvents to prepare an ionomer composition, coating a substrate with the ionomer composition to form a coating layer, and drying the coating layer-formed substrate in a dryer.

FIG. 1 is a flowchart schematically illustrating an exemplary process for manufacturing an exemplary electrolyte membrane according to an exemplary embodiment of the present invention. Hereinafter, respective steps of the flowchart shown in FIG. 1 will be described in detail.

(1) Preparing Substrate

As shown in FIG. 1, a substrate 6 serving as a base of an electrolyte membrane may be supplied using an unwinding roll 1. The substrate arbitrarily used in the present invention may suitably be a film. The substrate should not be dissolved in the solvent of an ionomer composition and should not be melted during the drying of the ionomer composition.

The substrate 6 used in the present invention may suitably be made of any one selected from the group consisting of polyethylene, polypropylene, polyethylene terephthalate, polybutylene terephthalate, polyvinylidene fluoride, polyvinyl difluoroethylene, polyvinyl chloride, polyvinylidene chloride, polyester, polyacetal, polyamide, polycarbonate, polyimide, polyetherketone, polyetheretherketone, polyethylene ether nitrile, polyethylene naphthalene, polyethersulfone, polyphenylene oxide, polyphenylene sulfide, polytetrafluoroethylene, a tetrafluoroethylene-hexafluoropropylene copolymer, and a tetrafluoroethylene-perfluoroalkyl vinyl ether copolymer.

(2) Preparing Ionomer Composition

The ionomer may suitably be dispersed in a solvent admixture to prepare an ionomer composition.

The solvent admixture may suitably include one or more selected from water, ethanol, isopropyl alcohol, n-propylalcohol, butylalcohol, methanol, dimethylformamide, dimethylacetamide, dimethyl sulfoxide, N-methylpyrrolidone, tetrahydrofuran, acetone, methylethylketone, tetramethylurea, trimethyl phosphate, butyrolactone, isophorone, carbitol acetate, methyl isobutyl ketone, N-butylacetate, cyclohexanone, diacetone alcohol, diisobutyl ketone, ethyl acetoacetate, glycol ether, propylene carbonate, ethylene carbonate, dimethyl carbonate and diethyl carbonate.

Alternatively, the solvent admixture may include a first solvent and one or more solvents. The first solvent may be different from the one or more solvents. The first solvent may have different boiling point from the boiling points of the one or more solvents. The first solvent may have the greater boiling point that the boiling points of the one or more solvents.

For example, the solvent admixture may include water, and may further include one or more selected from the group consisting of ethanol, isopropyl alcohol, n-propylalcohol, butylalcohol, methanol, dimethylformamide, dimethylacetamide, dimethyl sulfoxide, N-methylpyrrolidone, tetrahydrofuran, acetone, methylethylketone, tetramethylurea, trimethyl phosphate, butyrolactone, isophorone, carbitol acetate, methyl isobutyl ketone, N-butylacetate, cyclohexanone, diacetone alcohol, diisobutyl ketone, ethyl acetoacetate, glycol ether, propylene carbonate, ethylene carbonate, dimethyl carbonate and diethyl carbonate.

Preferably, the solvent admixture may include water, and may further include one or more selected from the group consisting of ethanol, isopropyl alcohol, n-propylalcohol, butylalcohol, methanol, dimethylformamide, dimethylacetamide, dimethyl sulfoxide, N-methylpyrrolidone, tetrahydrofuran, acetone, methylethylketone, tetramethylurea, trimethyl phosphate, butyrolactone, isophorone, carbitol acetate, methyl isobutyl ketone, N-butylacetate, cyclohexanone, diacetone alcohol, diisobutyl ketone, ethyl acetoacetate, glycol ether, propylene carbonate, ethylene carbonate, dimethyl carbonate and diethyl carbonate.

The ionomer may be homogeneously dispersed in the solvent admixture. The ionomer may be a polymer resin having the ability to conduct protons and may suitably be a polymer resin having one or more cationic exchange groups selected from the group consisting of a sulfonic acid group, a carboxylic acid group, a phosphoric acid group, a phosphonic acid group and a derivative thereof.

Preferably, the ionomer may include one or more polymers selected from a fluoro-based polymer (Nafion, Aciplex, Flemion), a benzimidazole-based polymer, a polyimide-based polymer, a polyamide-based polymer, a polyaryleneether-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphosphazene-based polymer, a polystyrene-based polymer, radiation-grafted FEP-g-polystyrene, radiation-grafted PVDF-g-polystyrene and a polyphenylquinoxaline-based polymer, even more specifically, poly(perfluorosulfonic acid), poly(perfluorocarboxylic acid), a copolymer of tetrafluoroethylene having a sulfonic acid group and fluorovinylether, polyetherketone sulfide, aryl ketone, poly(2,2'-m-phenylene)-5,5'-bibenzimidazole and poly(2,5-benzimidazole).

(3) Forming Coating Layer on Substrate

The substrate 6 supplied from the unwinding roll 1 may be coated with an ionomer composition using a coater 8 disposed on a guide roll 2 and the substrate 6 may be coated with the ionomer composition containing the solvent and an ionomer by the coater 8 to form a coating layer.

In an exemplary embodiment of the present invention, the method may further include disposing (e.g. inserting) a porous substrate (e.g., expanded polytetrafluoroethylene or ePTFE) into the coating layer formed on the substrate 6 to impregnate the porous substrate with the ionomer composition and coating the ionomer composition-impregnated porous substrate with the ionomer composition again.

The coating may suitably be performed by one or more methods selected from knife coating, gravure coating, micro-gravure coating, slot die coating, roll coating, spin coating, spray coating, dip coating, flow coating, doctor blade, dispensing, inkjet printing, offset printing, screen printing, pad printing, gravure printing, flexography printing and stencil printing.

(4) Drying Coating Layer-Formed Substrate

In this step, the substrate 7 including the coating layer formed by coating with the ionomer composition by the coater 8 may pass through a guide roll 3 and be dried by a dryer 9. The dryer 9 may maintain the temperature less than boiling points of all solvents contained in the ionomer composition and allow all solvents excluding water to be removed by evaporation, but may allow water to be removed depending on purpose.

For example, when the solvent admixture includes water as the first solvent and normal-propanol, the dryer 9 maintains a temperature less than 97° C., which is the boiling point of normal-propanol. In addition, when the solvent admixture includes water, normal-propanol and ethanol, the dryer 9 maintains a temperature less than 78.4° C., which is the boiling point of ethanol.

At this time, when the dryer 9 has a temperature greater than the boiling point of the solvents in the solvent admixture, liquid-gas equilibrium of the solvents may be eliminated and impurities may be produced by dehydration which will be described later or selective evaporation of the solvent is thus impossible.

A gas, which may include at least the same solvent of the first solvent that is different from the other solvents to be evaporated from the solvent admixture in earlier stage of the drying process, may be present. In this case, preferably, the gas may be present in a saturated state.

The first solvent that is present as gas in the dryer 9, among the solvents of the ionomer composition, may be evaporated and removed later than the solvents of the solvent admixture and not present in the gas.

In this case, among the solvents of the ionomer composition, any solvents which may cause discoloration when remaining on the substrate may preferably be removed by earlier stage of the drying.

Thus, the method may include controlling drying environments so as to impart chemical equilibrium to the solvent to be left on the substrate based on the Le Chatelier's principle. For example, the liquid of the corresponding solvent (=solvent to be left) during drying may evaporate, thereby making a reverse reaction of the reaction for producing gas dominant and selectively removing solvents not present in a saturated state, excluding the corresponding solvent.

One or more solvents may be present in a saturated state in the gas in the dryer 9 and the one or more solvents unsaturated in a gas state can be simultaneously removed by evaporation.

At this time, water should be saturated as the gas in the dryer 9. When water does not maintain the saturated state in the dryer 9, other solvents, e.g., alcohol solvents, are dehydrated by an acidic ionomer and water present as liquid on the substrate is evaporated so that dehydration occurs until the dryer 9 is saturated with water vapor, which results in production of undesired impurities. This may occur due to the fact that water produced by forward dehydration reaction is evaporated by drying, resulting in continuous acceleration of the dehydration. However, when water is removed early depending on purpose, water may not maintain a saturated gas state in the dryer 9. In this case, preferably, other solvent, excluding water, may maintain a saturated gas state.

When water vapor is present as water gas in the dryer 9, relative humidity should be 30% or greater. At this time, when relative humidity is less than about 30%, there is no difference in evaporation between water present in the ionomer composition and another solvent, so that all solvents competitively may evaporate, thus resulting in discoloration of the electrolyte membrane.

The saturated water vapor pressure, which is a basis of the relative humidity, may be set based on the drying temperature of the dryer 9.

An example of the reaction mechanism in which normal-propyl alcohol is dehydrated by an acidic sulfuric acid will be described below in brief. By the forward dehydration reaction resulting in production of water, normal-propyl alcohol is converted into propene having a double bond. The propene may be considered to be an undesired impurity of the present invention.

However, when the humidity in the dryer is a saturated water vapor pressure or more, water in the solvent is not evaporated by drying and eventually, the reverse dehydration reaction is dominant, so that impurities are not produced.

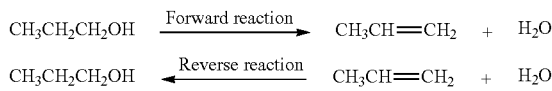

FIG. 2 is a schematic view illustrating evaporation of a solvent consisting of water and normal-propyl alcohol.

Figure 2A:
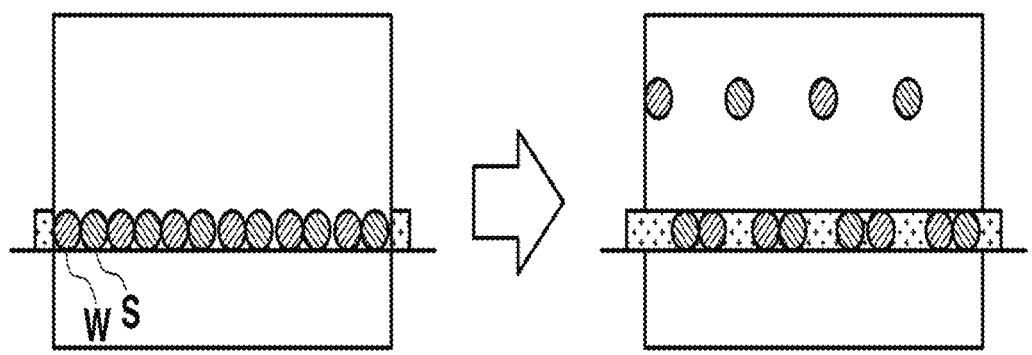
FIG. 2A schematically shows a process in which water and normal-propyl alcohol are evaporated competitively.
Figure 2B:
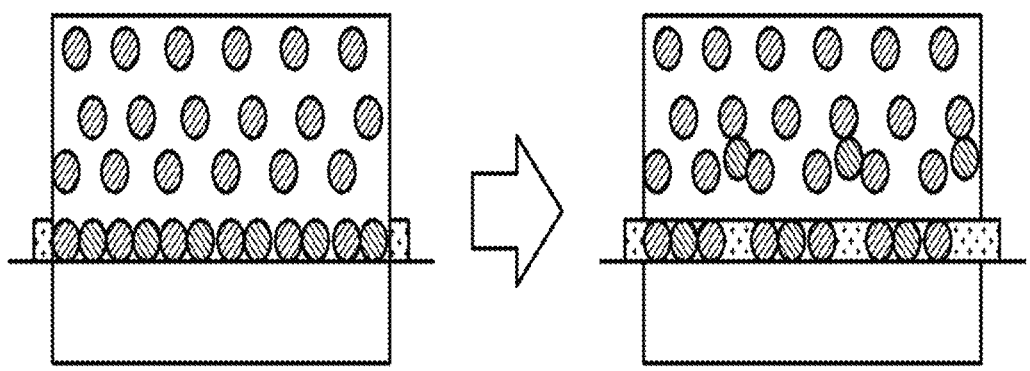
FIG. 2B schematically shows a process in which only normal-propyl alcohol is selectively evaporated in a saturated water environment.

FIG. 2A is a schematic view illustrating dry-type drying by a conventional method in the related art and illustrates that water (W) and normal propyl alcohol (S) competitively evaporate. On the other hand, as can be seen from FIG. 2B showing the drying step of the present invention, only normal propyl alcohol (S) is selectively evaporated while water (W) is saturated.

The time at which the dryer 9 conducts drying may be about 5 minutes to 120 minutes, about 5 minutes to 60 minutes, or particularly of about 5 minutes to 30 minutes. At this time, when the drying time is less than about 5 minutes, the solvent may not be sufficiently dried, and when the drying time is greater than about 120 minutes, productivity and efficiency of the process may be deteriorated.

The drying time of the present invention may depend on drying temperature, the type and the number of the solvent.

In other words, when an ionomer composition contains two or more solvents having different boiling points, the drying temperature may not be higher than a boiling point of the solvent having the lowest boiling point and the drying time may be lengthened to some extent to completely remove a solvent having a relatively high boiling point.

(5) Heat-Treating Dried Substrate

All solvents excluding water may be removed on the substrate having passed through the dryer 9. For this reason, preferably, water may be removed by a heat-treatment device 10 and only the ionomer may remain on the substrate.

The heat-treatment of the present invention may be characterized in that the solvent remaining on the substrate is removed while at the same time the structural stability of the ionomer is obtained.

The temperature required for heat-treatment of the dried substrate according to an exemplary embodiment of the present invention may suitably be about 100° C. to 200° C., or particularly about 140° C. to 160° C. When the heat-treatment temperature is less than about 100° C., water remaining on the substrate may not be completely removed by heat-treatment, and when the heat-treatment temperature is greater than about 200° C., the substrate in the heat-treatment device (heater) 10 may be deformed, and the ionomer may be deformed by heat and the electrolyte membrane may fail to carry out its original function.

The time at which the heat-treatment device 10 conducts heat-treatment may suitably be about 5 minutes to 30 minutes. When the heat-treatment time is less than about 5 minutes, water on the substrate may not be sufficiently removed, and when the heat-treatment time is greater than about 30 minutes, the productivity of the electrolyte membrane may be deteriorated.

When the substrate, having passed through the dryer 9, enters the heat-treatment device 10, all solvents excluding water may suitably be removed from the substrate. When other solvents excluding water are contained in the substrate, residual solvents may be involved in dehydration due to the ionomer on the substrate and may be converted into impurities by dehydration, which may cause deterioration in conductivity of the electrolyte membrane. At this time, during heat-treatment, moisture removed from the substrate may further facilitate dehydration.

(6) Winding Electrolyte Membrane

In this step, the substrate (hereinafter, referred to as an "electrolyte membrane") having passed through the heat-treatment device 10 may pass through a guide roll 4 and may be wound on a rewinding roll 5. All solvents may be moved from the finished electrolyte membrane and only ionomer may remain therein.

However, the electrolyte membrane having passed through the heat-treatment device 10 may be subjected to heat-treatment again, if necessary. The re-heat treatment may be carried out for a short time repeatedly to completely remove residual moisture on the substrate without deformation of the substrate and ionomer.

EXAMPLE

Hereinafter, the present invention will be described in more detail with reference to Preparation Example and Example. However, Preparation Example and Example should not be construed as limiting the scope of the present invention.

<Preparation Example> Dehydration of Alcohol 60 mL of normal-propyl alcohol (nPA) was mixed with 20 mL of 0.5 M sulfuric acid ($H_2SO_4$), the resulting mixture was filled in a beaker and the color of the ionomer composition was observed.

At this time, nPA had a pKa of 16.1 and $H_2SO_4$ had a pKa of −9, so that $H_2SO_4$ served as an acid.

The hydrogen ion of the sulfuric acid reacted with nPA, thus resulting in dehydration.

Figure 3A:
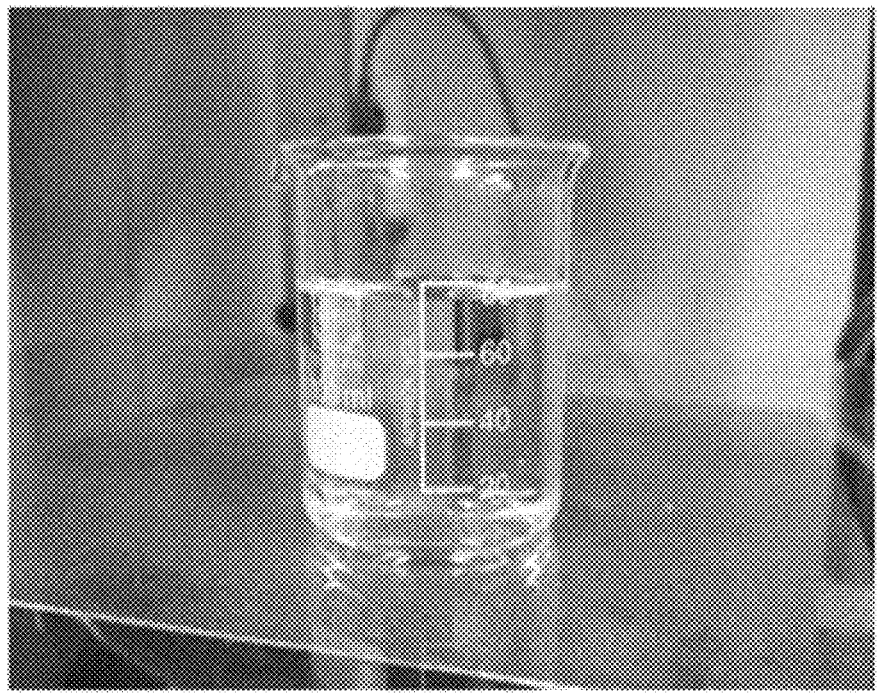
FIG. 3A shows the color of the initial ionomer composition of dehydration reaction between sulfuric acid and normal-propyl alcohol.
Figure 3B:
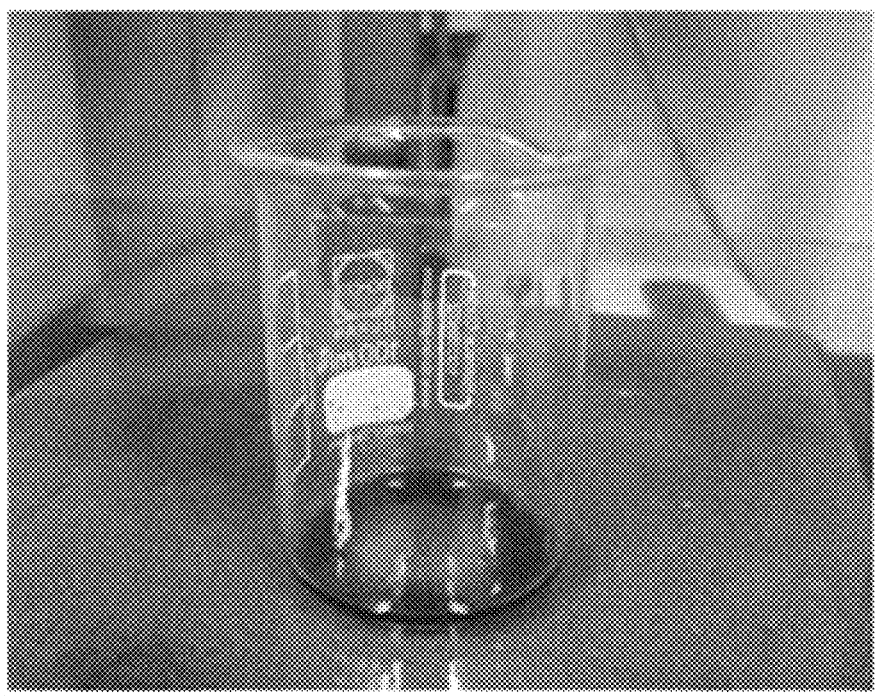
FIG. 3B shows the color of the late ionomer composition of dehydration reaction of sulfuric acid and normal-propyl alcohol.

FIG. 3 shows color change in initial and late stages of dehydration between sulfuric acid and normal-propyl alcohol. The color of the transparent ionomer composition in the initial dehydration stage can be seen from FIG. 3A, and creation of a brown substance in the late dehydration stage can be seen from FIG. 3B.

This result shows that normal-propyl alcohol was converted into propene or a substance having a double bond containing propene as a precursor through dehydration.

Example 1

A PFSA-based fluorine-based ionomer was diluted with water and nPA to prepare an ionomer composition. The prepared ionomer composition was applied to release paper and dried in a convection oven saturated with water vapor and set to a temperature of 80° C. for 30 minutes.

The dried release paper was heat-treated at different temperatures of 160° C., 180° C. and 200° C. for 10 minutes three times in total and color change was observed with the naked eye. Then, photographs were taken and the color of the release paper was extracted from the photographs, and the values for RGB, Hue, Saturation and Intensity were summarized in the following Table 2.

In this case, the release paper is basically a transparent release paper with no color, and the RGB (Red, Green, Blue), Hue, Saturation and Intensity of bottom as a reference for color change comparison are summarized in the following Table 1.

TABLE 1

|  | Bottom |
|---|---|
| Hue | 147 |
| Saturation | 10 |
| Intensity | 206 |
| Red | 217 |
| Green | 218 |
| Blue | 220 |

TABLE 2

|  | 160° C. | 180° C. | 200° C. |
|---|---|---|---|
| Hue | 40 | 32 | 28 |
| Saturation | 25 | 46 | 38 |
| Intensity | 195 | 182 | 181 |
| Red | 212 | 205 | 202 |
| Green | 212 | 200 | 196 |
| Blue | 202 | 181 | 182 |

Figure 4:
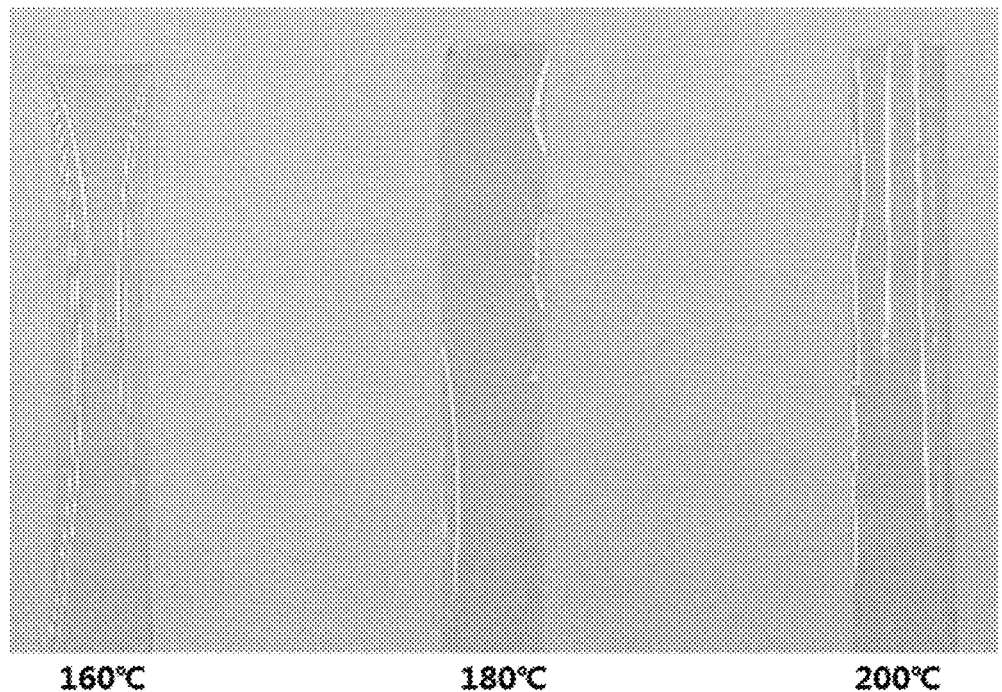
FIG. 4 is an image showing color change of an exemplary electrolyte membrane undergoing drying according to an exemplary embodiment of the present invention.

As can be seen from FIG. 4, images of samples heat-treated at a temperature of 160° C., 180° C. and 200° C. in this order from the left are shown. When each sample was observed with the naked eye, it can be confirmed that the release paper maintained transparency at all temperatures and the bottom color which is a standard of color change was projected.

As shown in Table 2, the color of the release paper according to each temperature was extracted. When the color of the release paper was compared with Table 1, which is a standard of the color change, it can be seen that there was not much difference in RGB.

As a result, it can be confirmed that no discoloration occurred due to absence of discoloration-inducing substances even if the temperature of heat treatment were raised.

Comparative Example 1

Electrolyte membranes were manufactured in the same manner as in Example 1, except the drying was conducted in a convection oven saturated with water vapor and then heat-treated at different temperatures of 160° C., 180° C. and 200° C. for 10 minutes three times at which color change was observed with the naked eye. Then, photographs were taken to extract RGB, Hue, Saturation and Intensity, and the results are summarized in the following Table 3.

At this time, the release paper was basically a transparent release paper having no color, and the RGB, Hue, Saturation and Intensity of the bottom as a reference for color change comparison were the same as those in Table 1 above.

TABLE 3

|  | 160° C. | 180° C. | 200° C. |
|---|---|---|---|
| Hue | 31 | 31 | 33 |
| Saturation | 101 | 92 | 99 |
| Intensity | 175 | 173 | 155 |
| Red | 215 | 211 | 202 |
| Green | 202 | 198 | 188 |
| Blue | 157 | 156 | 127 |

Figure 5:
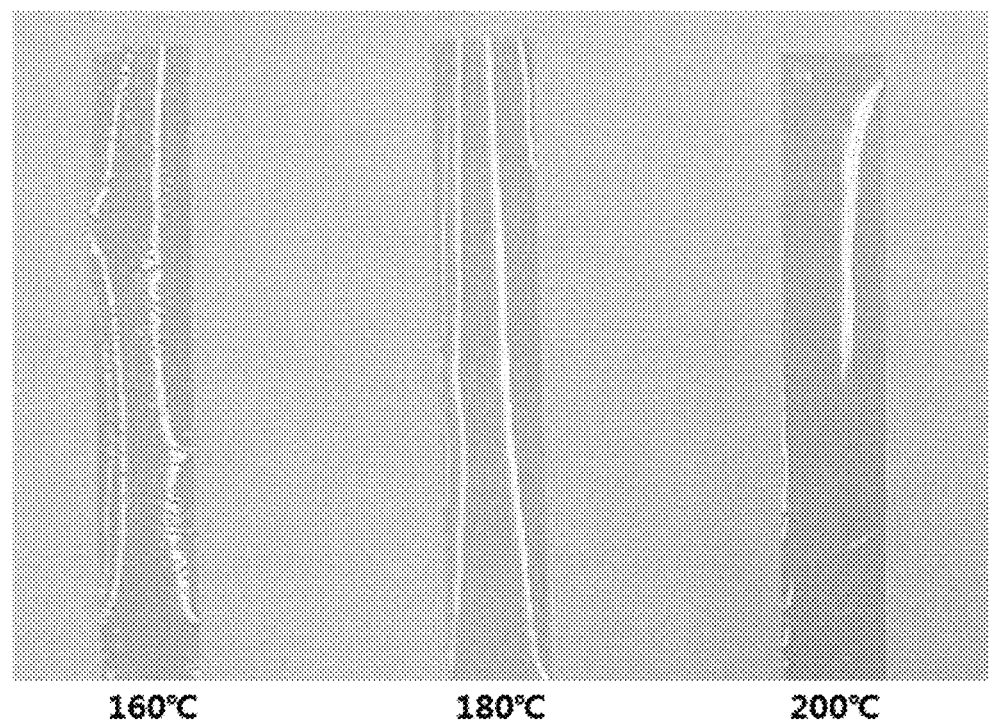
FIG. 5 is an image showing color change of an electrolyte membrane undergoing drying according to a conventional method.

As can be seen from FIG. 5, images of samples heat-treated at a temperature of 160° C., 180° C. and 200° C. in this order from the left are shown.

When observed with the naked eye, the color of the release paper shows a pale yellow color at a temperature of 160° C. and a turbid and dark yellow color at a temperature of 200° C.

The color of the release paper according to each temperature was extracted as shown in Table 3, and it can be seen that there was a large difference in RGB when compared with Table 1, which is a standard of color change.

Specifically, it can be seen that the blue value of RGB was low. Especially, as the heat treatment temperature was increased, the blue value was significantly different from the reference value of Table 1.

In conclusion, as heat treatment temperature increases, water evaporation may become more active, and as dehydration becomes faster, impurities (brown substances) may increase.

Example 2

A PFSA-based fluorine-based ionomer was diluted with water and nPA to prepare an ionomer composition. The prepared ionomer composition was applied to release paper and dried in a convection oven saturated with water vapor and set to a temperature of 80° C. for 5 minutes.

At this time, drying was carried out five times by setting the oven to different relative humidities (RH) of 5%, 20%, 30%, 60% and 80%. In this case, relative humidity is indicated as a percentage of a real water vapor pressure in the oven, based on a saturated water vapor pressure at a temperature of 80° C.

The dried release paper was heat-treated at a temperature of 160° C. for 30 minutes and color change was observed with the naked eye. And photographs were taken to extract RGB, Hue, Saturation and Intensity. The results are summarized in the following Table 5.

At this time, the release paper was basically a transparent release paper having no color, and the RGB, Hue, Saturation and Intensity of the bottom as a reference for color change comparison were the same as those in the following Table 4.

TABLE 4

|  | Bottom |
| --- | --- |
| Hue | 160 |
| Saturation | 0 |
| Intensity | 210 |
| Red | 223 |
| Green | 223 |
| Blue | 223 |

TABLE 5

|  | RH 5% (R1) | RH 20% (R2) | RH 30% (R3) | RH 60% (R4) | RH 80% (R5) |
| --- | --- | --- | --- | --- | --- |
| Hue | 34 | 34 | 28 | 18 | 28 |
| Saturation | 111 | 75 | 36 | 30 | 26 |
| Intensity | 182 | 192 | 209 | 207 | 197 |
| Red | 222 | 220 | 227 | 224 | 214 |
| Green | 214 | 215 | 224 | 219 | 211 |
| Blue | 165 | 188 | 217 | 215 | 204 |

Figure 6:
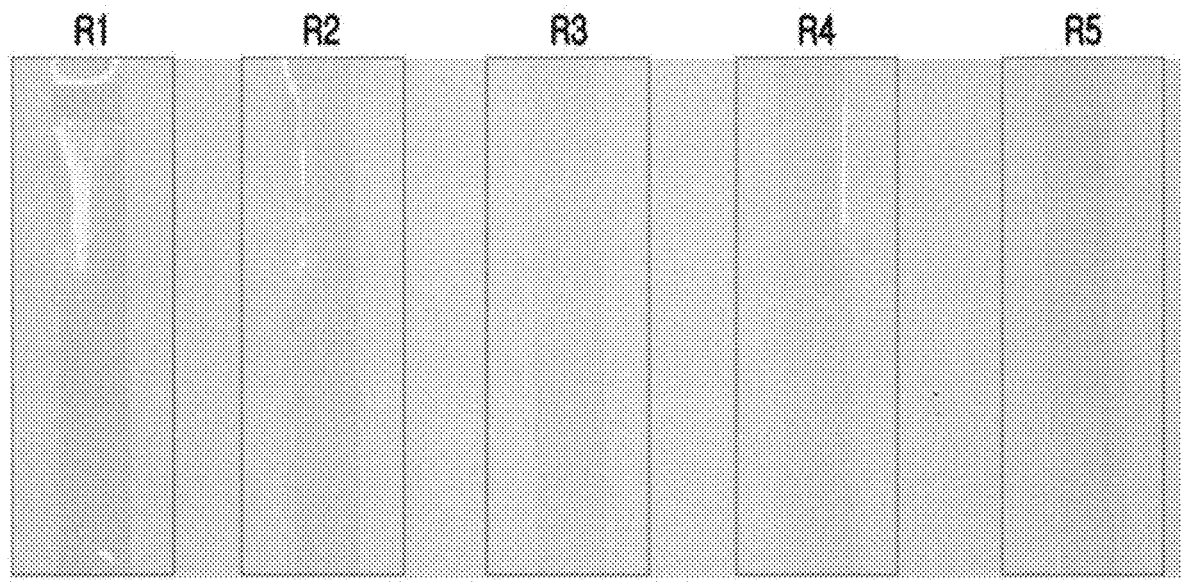
FIG. 6 is an image showing color change of an exemplary electrolyte membrane depending on drying environments of different relative humidities.

FIG. 6 shows images of samples dried at RH of 5% (R1), 20% (R2), 30% (R3), 60% (R4) and 80% (R5) in this order from the left.

Observation with the naked eye, results showed that R1 and R2 changed color to yellow and R3 to R5 maintained the transparency of the release paper.

In Table 5, it can be seen that the Blue values of RGB were much different from the values shown in Table 4 above. In addition, while the saturation of the bottom as a reference of the color change observation was achromatic gray and has a saturation of 0, R1 and R2 indicate saturation values slightly higher than those of R3 to R5.

As a result, it can be confirmed that the color change was much progressed when R1 and R2 were compared with R3 to R5.

That is, test results showed that the release paper could maintain the original transparent color under conditions at a temperature of 80° C. and RH of 30% or greater, by selective removal of nPA. In addition, unless impurities were present in the release paper (unless no color change was observed), color did not change even after heat-treating at a high temperature of 160° C.

Example 3

Figure 7:
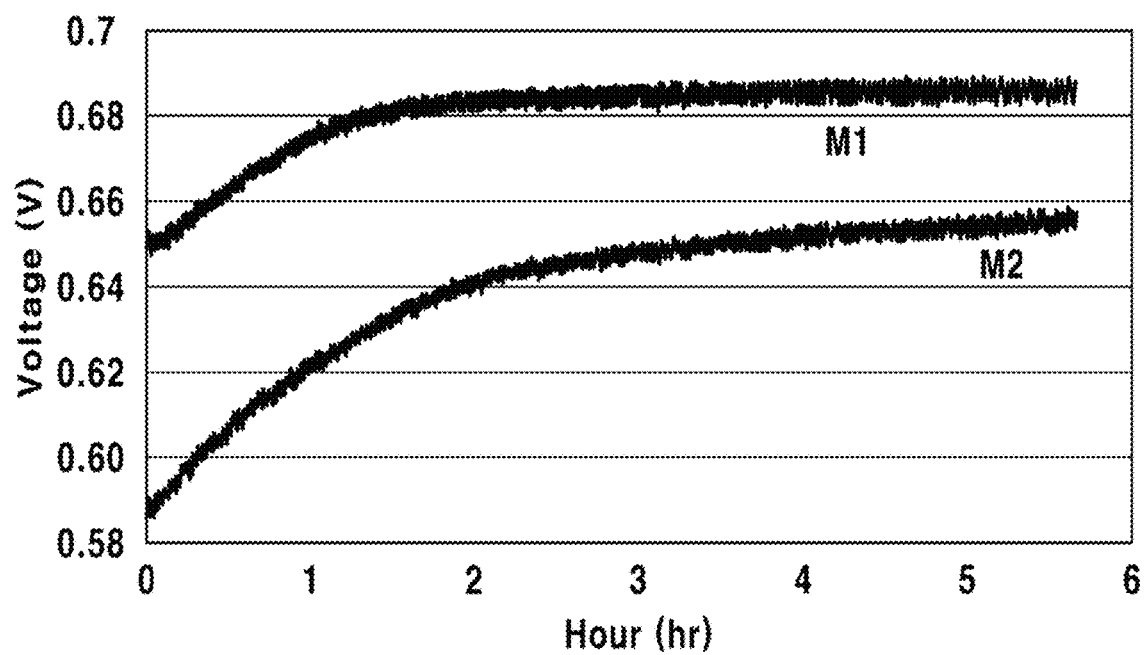
FIG. 7 is a graph showing an activation rate and performance of the membrane over time.

An electrolyte membrane M1 manufactured by drying at a temperature of 65° C. and RH of 100% and an electrolyte membrane M2 manufactured without the drying according to the present invention were subjected to activation operation in the presence of hydrogen and air flow in a ratio of 1.5/2.0 and results are shown in FIG. 7.

In this case, M1 represents an electrolyte membrane that did not undergo discoloration and had no impurities on the electrolyte membrane, and M2 represents a conventional electrolyte membrane that had undergone discoloration and had impurities remaining un-removed on the electrolyte membrane.

As can be seen from the graph showing results of FIG. 7, M1 exhibited high activation rate and excellent performance, while M2 exhibited low activation rate and poor performance.

That is, discoloration may be due to impurities present in the electrolyte membrane and these impurities may act as resistances of ion channels, thus negatively affecting power generation.

As apparent from the foregoing, in accordance with the method of manufacturing an electrolyte membrane according to various exemplary embodiments of the present invention, conductivity may be improved and compensation time may be shortened by effectively removing residual solvents from the electrolyte membrane, and fuel cell performance may be improved by providing a higher constant voltage, as compared to conventional fuel cells.

In accordance with various exemplary methods of manufacturing an electrolyte membrane, undesired solvents may be selectively removed by controlling the evaporation rate of residual solvents in the electrolyte membrane.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing an electrolyte membrane comprising:
   dispersing an ionomer in a solvent admixture to prepare an ionomer composition; coating a substrate with the ionomer composition to form a coating layer; and
   drying the coating layer-formed substrate in the presence of a gas,
   wherein, the gas comprises a first solvent and the solvent admixture comprises the first solvent and one or more solvents different from the first solvent.

2. The method according to claim 1, wherein the ionomer comprises one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer and a polystyrene-based polymer.

3. The method according to claim 1, wherein the solvent admixture comprises water and one or more selected from the group consisting of ethanol, isopropyl alcohol, n-propylalcohol, butylalcohol, methanol, dimethylformamide, dimethylacetamide, dimethyl sulfoxide, N-methylpyrrolidone, tetrahydrofuran, acetone, methylethylketone, tetramethylurea, trimethyl phosphate, butyrolactone, isophorone, carbitol acetate, methyl isobutyl ketone, N-butylacetate, cyclohexanone, diacetone alcohol, diisobutyl ketone, ethyl acetoacetate, glycol ether, propylene carbonate, ethylene carbonate, dimethyl carbonate and diethyl carbonate.

4. The method according to claim 1, wherein the substrate comprises one or more selected from the group consisting of polyethylene, polypropylene, polyethylene terephthalate, polybutylene terephthalate, polyvinylidene fluoride, polyvinyl difluoroethylene, polyvinyl chloride, polyvinylidene chloride, polyester, polyacetal, polyamide, polycarbonate, polyimide, polyetherketone, polyetheretherketone, polyethylene ether nitrile, polyethylene naphthalene, polyethersulfone, polyphenylene oxide, polyphenylene sulfide, polytetrafluoroethylene, a tetrafluoroethylene-hexafluoropropylene copolymer, and a tetrafluoroethylene-perfluoroalkyl vinyl ether copolymer.

5. The method according to claim 1, further comprising:
disposing a porous support into the formed coating layer; and
coating the disposed porous support with the ionomer composition.

6. The method according to claim 5, wherein the porous support comprises expanded polytetrafluoroethylene (ePTFE).

7. The method according to claim 1, wherein, during the drying, the one or more solvents different from the first solvent are evaporated earlier than the first solvent.

8. The method according to claim 7, wherein the one or more solvents different from the first solvent comprises an alcohol-based solvent.

9. The method according to claim 7, wherein the first solvent is water.

10. The method according to claim 1, wherein, during the drying, the gas is present in a saturated state.

11. The method according to claim 1, wherein the drying is performed for about 5 minutes to 30 minutes.

12. The method according to claim 1, wherein the drying is performed in a dryer and, relative humidity (RH) in the dryer is about 30% or greater.

13. The method according to claim 1, wherein a temperature of the drying is maintained at less than a boiling point of a solvent having the lowest boiling point in the solvent admixture.

14. The method according to claim 1, further comprising:
after the drying, heat-treating the coating layer-formed substrate at a temperature of about 140 to 200° C.

15. The method according to claim 14, wherein the heat-treating is performed for about 5 minutes to 30 minutes.

* * * * *